United States Patent
Dahms et al.

(10) Patent No.: US 7,488,006 B2
(45) Date of Patent: Feb. 10, 2009

(54) COUPLING ASSEMBLY

(75) Inventors: Jason W. Dahms, Bowling Green, OH (US); David S. Densel, Whitehouse, OH (US); Ryan J. Williams, Sylvania, OH (US)

(73) Assignee: Eaton Corporation, Cleveland, OH (US)

( * ) Notice: Subject to any disclaimer, the term of this patent is extended or adjusted under 35 U.S.C. 154(b) by 168 days.

(21) Appl. No.: 11/046,169

(22) Filed: Jan. 28, 2005

(65) Prior Publication Data

US 2005/0167979 A1 Aug. 4, 2005

Related U.S. Application Data

(60) Provisional application No. 60/541,083, filed on Feb. 2, 2004.

(51) Int. Cl.
 *F16L 39/00* (2006.01)
(52) U.S. Cl. ............... 285/321; 285/39; 285/305
(58) Field of Classification Search .......... 285/39, 285/305, 321
 See application file for complete search history.

(56) References Cited

U.S. PATENT DOCUMENTS

| | | | |
|---|---|---|---|
| 2,479,960 A | 8/1949 | Osborn | |
| 2,805,089 A * | 9/1957 | Hansen | 285/317 |
| 2,848,255 A | 8/1958 | Klein et al. | |
| 3,177,018 A | 4/1965 | Goodwin | |
| 3,398,977 A | 8/1968 | Yoneda | |
| 3,773,360 A | 11/1973 | Timbers | |
| 3,887,222 A | 6/1975 | Hammond | |
| 4,105,226 A | 8/1978 | Frey et al. | |
| 4,240,654 A | 12/1980 | Gladieux | |
| 4,278,276 A * | 7/1981 | Ekman | 285/49 |
| 4,872,710 A | 10/1989 | Konecny et al. | |
| 5,022,687 A | 6/1991 | Ariga | |
| 5,076,541 A | 12/1991 | Daghe et al. | |
| 5,098,241 A * | 3/1992 | Aldridge et al. | 411/433 |
| 5,226,682 A * | 7/1993 | Marrison et al. | 285/308 |
| 5,553,895 A | 9/1996 | Karl et al. | |
| 5,570,910 A * | 11/1996 | Highlen | 285/308 |
| 5,709,415 A | 1/1998 | Witter | |

(Continued)

FOREIGN PATENT DOCUMENTS

DE 31 46379 A1 6/1983

(Continued)

*Primary Examiner*—Aaron M Dunwoody
*Assistant Examiner*—Fannie Kee
(74) *Attorney, Agent, or Firm*—Benesch, Friedlander Coplan & Aronoff LLP

(57) ABSTRACT

A coupling assembly includes a first coupling member having a first exterior surface and a second exterior surface spaced from the first exterior surface by a rib having a first locking surface. A second coupling member includes an inwardly facing surface sized to receive the first coupling member and an inwardly facing annular groove having a second locking surface. The groove is configured to reduce stress risers in the second coupling member. A resiliently expandable locking ring is received in the inwardly facing annular groove and is engaged and expanded to a larger radial size by the rib upon movement of the first coupling member further into the second coupling member. The resiliently expandable locking ring is configured to retract in diametrical size to become trapped between the first locking surface and the second locking surface upon further movement of the first coupling member into the second coupling member.

5 Claims, 5 Drawing Sheets

U.S. PATENT DOCUMENTS

| | | | |
|---|---|---|---|
| 6,183,020 B1 * | 2/2001 | Luft | 285/93 |
| 6,186,557 B1 | 2/2001 | Funk | |
| 6,450,545 B1 | 9/2002 | LeMay et al. | |
| 6,494,494 B2 | 12/2002 | Vogel et al. | |
| 6,517,121 B1 * | 2/2003 | Cresswell | 285/321 |
| 6,530,604 B1 | 3/2003 | Luft et al. | |
| 6,533,327 B1 | 3/2003 | Twardawski et al. | |
| 6,554,320 B2 | 4/2003 | Cresswell | |
| 6,557,824 B1 | 5/2003 | Jenski, Jr. et al. | |
| 6,588,805 B2 | 7/2003 | Persohn et al. | |
| 6,592,151 B2 | 7/2003 | Densel et al. | |
| 6,604,760 B2 | 8/2003 | Cresswell et al. | |
| 6,637,781 B1 | 10/2003 | Seymour, II | |
| 6,749,231 B2 | 6/2004 | LeMay et al. | |
| 6,769,720 B2 | 8/2004 | Dahms et al. | |

FOREIGN PATENT DOCUMENTS

| | | |
|---|---|---|
| DE | 199 32 307 A1 | 1/2001 |
| EP | 0 615 089 A1 | 9/1994 |
| GB | 932 001 A | 7/1963 |

* cited by examiner

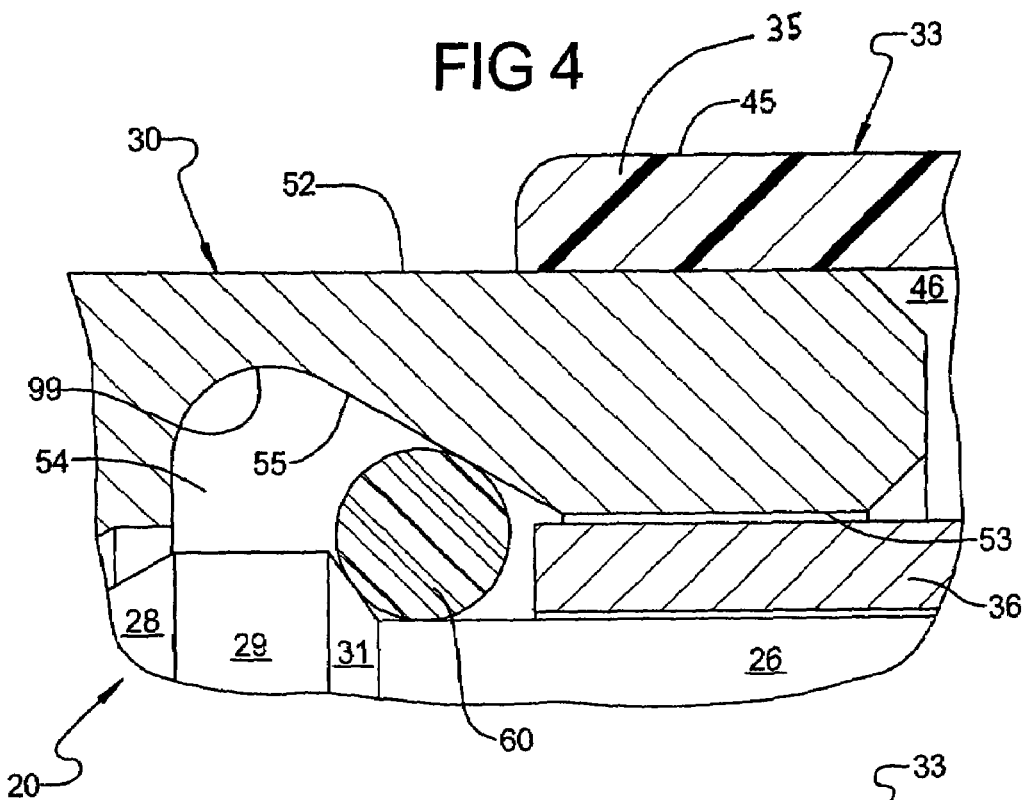
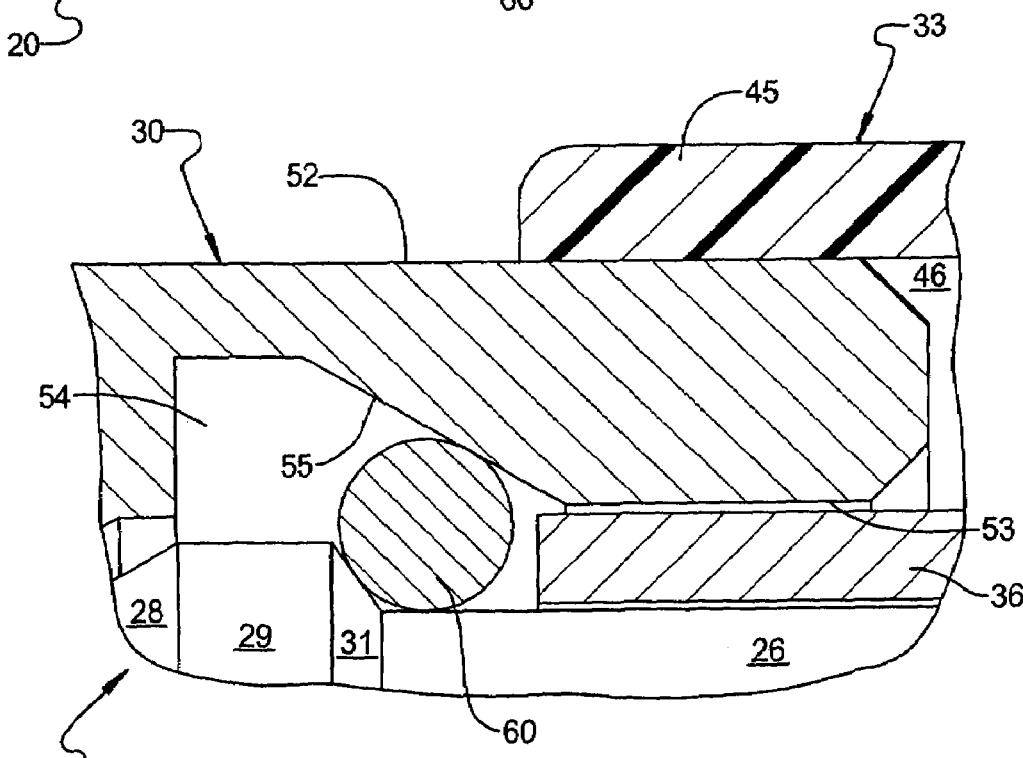

COUPLING ASSEMBLY

CROSS REFERENCE TO RELATED APPLICATIONS

This application claims priority to U.S. provisional application 60/541,083, filed on Feb. 2, 2004, which is incorporated herein by reference in its entirety.

BACKGROUND OF THE INVENTION

1. Field of the Invention

The present invention relates to push-to-connect style fluid connectors and, more particularly, to push-to-connect style fluid connectors that include a locking ring.

2. Description of the Related Art

There are many industrial applications where a high pressure hydraulic system requires that several connections be made between a hose assembly and a component, such as a pump, motor, valve, etc. Initially there were no push-to-connect (threadless) connection systems available that could satisfactorily operate at high pressure, prior art systems made use of threaded fittings to make this connection. Recently, push-to-connect style coupling assemblies have become available that can operate at high pressures. In one such coupling assembly, shown in FIGS. 1 and 2, a resiliently expandable locking ring is employed to secure a male coupling member within a female coupling member. In the prior art design, the female coupling member includes a chamfered surface against which the locking ring is engaged during connection of the male and female coupling members, and a retaining ring groove having two generally parallel sides positioned perpendicular to an inwardly facing surface of the groove. The locking ring is urged into the retaining ring groove during disconnection of the coupling members. While this design has proven successful in use, the transition point between the chamfer and the retaining ring groove, among other areas, may create an undesirable stress riser in the female coupling member during connection of some male and female coupling members. These stress risers may lead to localized cracking in the female member or a "flaring-out" of a receiving end of the female member due to the force exerted by the male member on the female member through the locking ring during connection and pressurization of the coupling assembly. For these and other reasons, an improved coupling assembly is desired that overcomes the limitations of the prior art.

SUMMARY OF THE INVENTION

A coupling assembly is provided that includes a first coupling member extending along an axis from a leading end to a trailing end. The first coupling member includes a first exterior surface and a second exterior surface spaced from the first exterior surface by a rib having a ramp extending outwardly and away from the first exterior surface and a first locking surface that extends inwardly toward the second exterior surface. A second coupling member extends from a receiving end to a remote end and includes an inwardly facing surface sized to receive the first coupling member. The second coupling member also includes an inwardly facing annular groove having a second locking surface. The groove is configured to reduce stress risers in the second coupling member. A resiliently expandable locking ring is received in the second coupling member inwardly facing annular groove in a first position. The resiliently expandable locking ring has an interior diameter sized to receive the first coupling member first exterior surface and to be engaged and expanded to a larger radial size by the ramp upon movement of the first coupling member further into the second coupling member. The resiliently expandable locking ring is configured to retract in diametrical size resiliently to become trapped between the first locking surface and the second locking surface upon further movement of the first coupling member into the second coupling member.

Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein:

FIG. 4 is a cross-sectional view of a coupling assembly connecting interface according to an embodiment of the invention;

FIG. 5 is a cross-sectional view of a coupling assembly connecting interface according to another embodiment of the invention;

DETAILED DESCRIPTION

Figure 1:
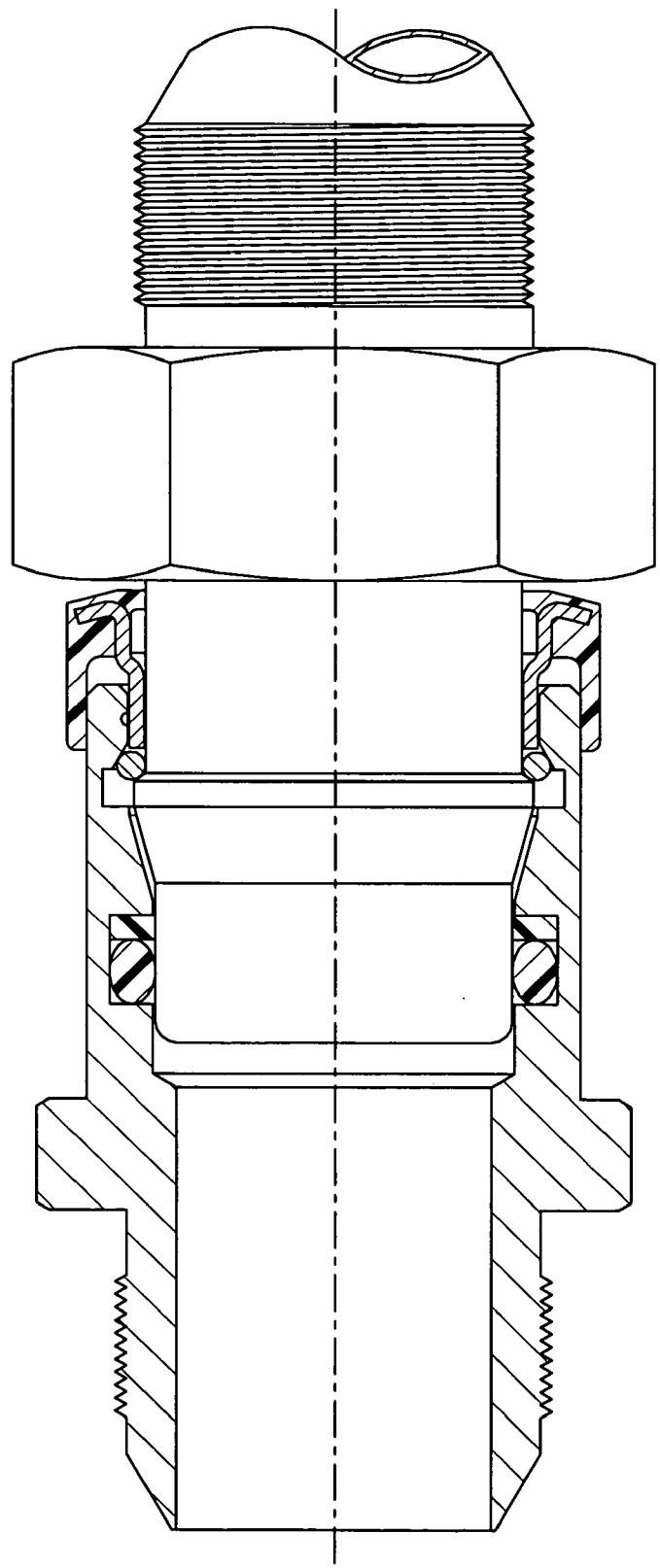
FIG. 1 is a partial cross-sectional view of a prior art coupling assembly.

Certain terminology will be used in the foregoing description for convenience in reference only and will not be limiting. The terms "forward" and "rearward" will refer to directions forward and rearward of the coupling assembly shown in the drawings. The terms "rightward" and "leftward" will refer to directions in the drawings in connection with which the terminology is used. The terms "inwardly" and "outwardly" will refer to directions toward and away from, respectively, the geometric center of the apparatus. The terms "upward" and "downward" will refer to directions as taken in the drawings in connection with which the terminology is used. All foregoing terms mentioned above include the normal derivative and equivalents thereof.

Figure 3:
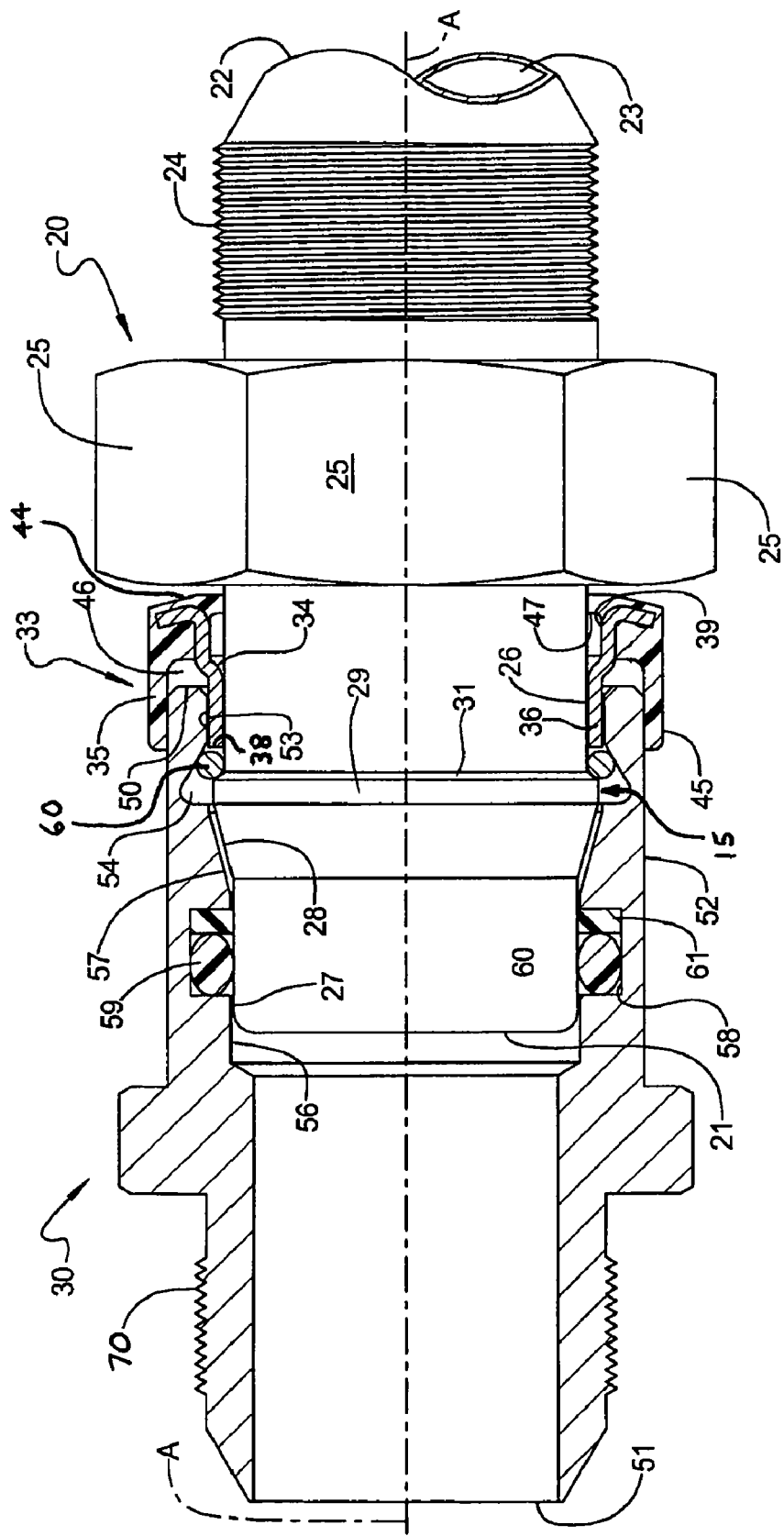
FIG. 3 is a cross-sectional view of a coupling assembly according to an embodiment of the invention.

Referring to FIG. 3, a coupling assembly according to an embodiment of the present invention includes a first or male member 20 and a second or female member 30. Each of the male member 20 and female member 30 extends along an axis A-A when the assembly is in the coupled position as shown in FIG. 3. The male member 20 extends from a leading end 21 intended for insertion into the female member 30 to a trailing end 22 and has a passageway 23 extending therethrough. If desired, the trailing end 22 may be provided with external threads 24 for attachment to a threaded coupling (not shown) and a series of flats 25 defining a non-circular (e.g., hexagonal) cross-section for engagement by a wrench.

Forwardly of the hexagonal cross-section defined by the flats 25, the male member 20 has a trailing cylindrical exterior surface 26 and a leading exterior surface 27, which are separated by a rib 15. In an embodiment, the rib 15 includes a ramp 28 extending generally rearwardly and outwardly from the leading exterior surface 27. In an embodiment, ramp 28 exhibits a generally linear profile when viewed in cross-section and extends at an angle relative to the axis A-A in the range of about 10 degrees to 25 degrees, such as, for example, an angle of about 18 degrees. In a particular configuration, ramp 28 extends to a cylindrical surface 29 that is parallel to the axis and extends rearwardly from the ramp 28 a distance of at least about 0.010 inch, such as, for example, about 0.030 inch. The final portion of the rib is a first locking surface 31. In the configuration shown in FIGS. 3 and 4, first locking surface 31 extends generally rearwardly and inwardly from cylindrical surface 29 to meet trailing exterior surface 26. In the illustrated embodiment, first locking surface 31 exhibits a linear profile when viewed in cross-section and tapers at an angle in the range of about 35 degrees to 55 degrees relative to the axis A-A, such as, for example, an angle of about 45 degrees. Alternatively, ramp 28 may extend to a point where it engages first locking surface 31 or to a non-linear surface, such as a curved surface, positioned between ramp 28 and first locking surface 31. Additionally, ramp 28 and first locking surface 31 may exhibit a non-linear profile when viewed in cross-section.

Male member 20 may also include a release sleeve 33 having a rigid portion 34 and a thermoplastic and/or elastomeric (e.g., TPE) sealing portion 35. In an embodiment, the rigid portion 34 includes a split cylindrical wall 36 having a plurality of slots (not shown). The split cylindrical wall 36 extends from a leading end 38 to an outwardly tapering wall portion 39. The slots may, if desired, extend into the tapered wall portion 39. As can be seen in FIGS. 3 and 4, the split cylindrical wall 36 and a cylindrical wall portion 45 of the sealing portion 35 cooperate to define a gap 46. The sealing portion 35 includes a sealing fin 47 extending radially inwardly from a flange portion 44. The sealing fin 47 snugly engages the trailing cylindrical exterior surface 26 and functions as a seal to prevent contaminants, such as dust, from entering the engaged coupling between the release sleeve 33 and the trailing exterior surface 26.

In an embodiment, the female member 30 extends from a receiving end 50 to a remote end 51, which may have adjacent thereto external threads 70 or other suitable connection means for fastening to a separate connection (not shown). The portion of the female member 30 adjacent the receiving end 50 is provided with an exterior cylindrical surface 52 sized to be snugly received in the cylindrical wall 45 of the release sleeve 33 and an interior cylindrical surface 53 sized to receive therein the split cylindrical wall portion 36 of the rigid portion 34 of release sleeve 33. An inwardly facing annular groove 54 extends outwardly from the interior cylindrical surface 53 and is sized to receive therein a resiliently expandable locking ring 60. Groove 54 includes a second locking surface 55 that extends toward the receiving end 50 to meet the interior cylindrical surface 53.

A second interior cylindrical surface 56 of smaller size than the first cylindrical surface 53 is positioned toward the remote end 51 from the annular groove 54 and is joined thereto by an inwardly tapering wall portion 57. The second interior cylindrical surface 56 is sized to receive the leading exterior surface 27 of the male member 20. The second interior cylindrical wall surface 56 has formed therein an inwardly facing annular groove 58 in which is positioned an annular seal 59 of neoprene or other suitable sealing material and a rigid plastic ring 61 that is positioned in the groove 58 between the annular seal 59 and the receiving end 50. The plastic ring 61 has an aperture sized to snugly receiving the leading exterior surface 27 of the first male member and the annular seal 59 is sized to sealingly receive and engage such leading exterior surface 27. The presence of the rigid plastic ring 61 in a position to be engaged by the leading end 21 of the male member 20 serves to protect the annular seal 59 from cutting or other damage upon insertion of the leading exterior surface 27 therethrough. The rigid plastic ring 61 also serves to protect the annular seal 59 from damage when used in systems having high impulse flow of fluid. Alternatively, annular seal 59 and ring 61 may be received in a groove (not shown) in the male member 20.

Positioned in the annular groove 54 is the resiliently expandable locking ring 60, which may be formed of, among other materials, a spring tempered phosphoric bronze material or, alternatively, a spring tempered stainless steel. In an embodiment, the locking ring 60 is provided with a first end and a second end, which may be in abutting relationship or have a maximum gap of about 0.03 inches when the male member 20 is disconnected from the female member 30. The locking ring 60, when the parts are in the disconnected position, has an external diameter smaller than the diameter defined by the outermost portion of the annular groove 54, but larger than the diameter of the first interior cylindrical surface 53. The locking ring 60 has an internal diameter substantially equal to or slightly smaller than that of the trailing exterior surface 26 of the male member 20 to snugly engage such trailing exterior surface 26 when the male member 20 is engaged to the female member 30. As will be appreciated, the internal diameter of the locking ring 60 is, therefore, significantly smaller than the diameter of the cylindrical surface 29. The locking ring 60, by virtue of its dimensions, will be retained in the annular groove 54 when the male member 20 is disconnected from the female member 30. However, by virtue of it being split, the diametrical size of the locking ring 60 may be expanded and the end portions separated as the locking ring 60 moves over the ramp 28 and optional cylindrical surface 29 upon insertion of the male member 20 into the female member 30.

During insertion of the male member 20 into the female member 30, the leading end 21 and leading exterior surface 27 will pass through the locking ring 60 until the ramp 28 reaches the locking ring 60. Continued inward movement of the male member 20 will cause the ramp 28 to expand the locking ring 60, thereby opening up the gap between the locking ring ends by increasing amounts as the locking ring 60 moves up to the maximum diameter of the ramp 28 and onto the optional cylindrical surface 29. As the cylindrical surface 29 moves past the locking ring 60 upon continued forward movement of the male member 20, the locking ring 60, by virtue of its resilience, will contract to a size approaching its original size and, in do so, will be positioned to prevent withdrawal of the male member 20 from the female member 30 since the split locking ring 60 is trapped between the first locking surface 31 and second locking surface 55.

Optionally, when the first locking surface 31 and the second locking surface 55 are linear surfaces, the two surfaces may be disposed at converging angles in the direction toward annular groove 54 when the male member 20 is engaged to the female member 30. This convergence results from the fact that the angle of the first locking surface 31 is greater than the angle of the second locking surface 55 in relation to the axis A-A as previously set forth.

When the male member 20 is fully engaged to the female member 30, the leading exterior surface 27 is sealingly engaged to the annular seal 59, thereby preventing leaking of fluid. Additionally, receiving end 50 and portions of the female member 30 adjacent thereto are positioned in the gap 46 between the cylindrical wall portion 45 of the sealing portion 35 and the split cylindrical wall 36 of the rigid portion 34. The exterior cylindrical surface 52 is snugly in contact with the interior of the cylindrical wall portion 45 to prevent, along with the sealing fin 47, contaminants from the entering the area around the locking ring 60 when the members are in the engaged position shown in FIG. 3.

With reference to FIG. 3, when the male member 20 is in the fully coupled or engaged position with the female member 30, there is a space between the receiving end 50 and the interior of the flange portion 44 which is, in effect, the end of the gap 46. Additionally, the leading end 38 of the release sleeve split cylindrical wall 36 is barely touching or slightly spaced from the locking ring 60. When it is desired to disconnect the male member 20 from the female member 30, it is simply necessary to move the release sleeve 33 toward the leading end 21, causing the leading end 38 of the split cylindrical wall 36 to urge the locking ring 60 axially toward the rib and, in so doing, to be urged outwardly by first locking surface 31 against which the locking ring 60 is being urged by the release sleeve 33. As will be appreciated, when the locking ring 60 has been urged to a position in alignment with the cylindrical surface 29 of the rib, the male member 20 will be released from the female member 30 and may be removed therefrom.

Figure 2:
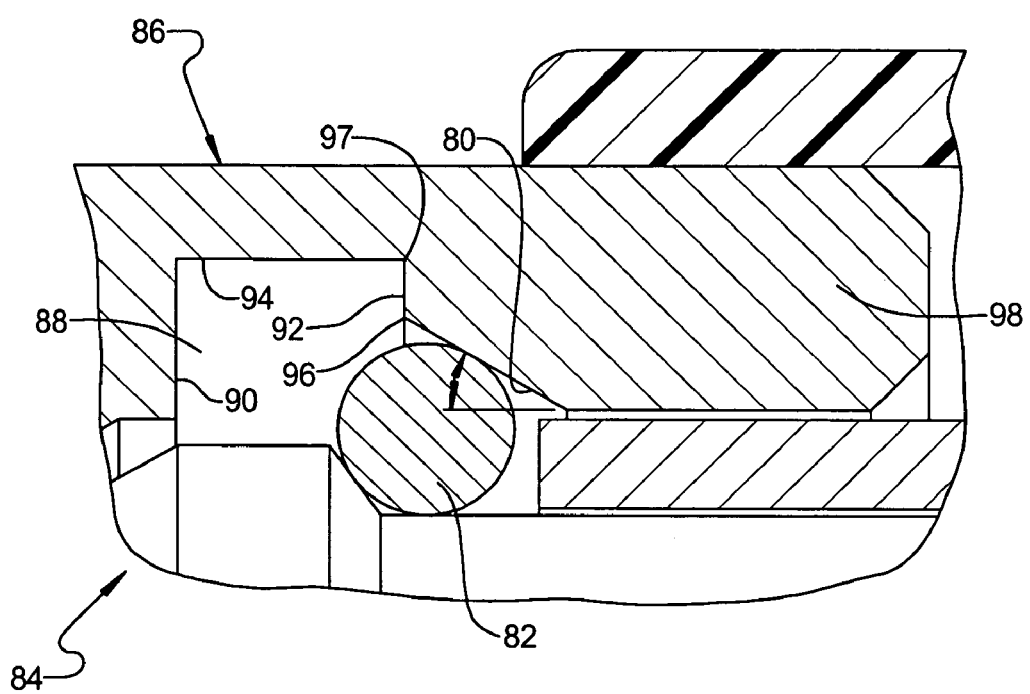
FIG. 2 is a detailed cross-sectional view of a connecting interface for the prior art coupling assembly shown in FIG. 1.

Referring to FIG. 2 for comparison, a cross-sectional view of a prior art coupling assembly connecting interface is shown. The prior art female coupling member includes a chamfered surface 80 against which a locking ring 82 is engaged during connection of the male and female coupling members 84, 86. The female member 86 also includes retaining ring groove 88 having two generally parallel sides 90, 92 positioned perpendicular to an inwardly facing surface 94 of the groove. Side 92 meets the chamfer surface 80 at a point 96 and inwardly facing surface 94 at a point 97. It is points 96 and 97 that form stress risers in the female member 30 during connection of the male and female coupling members. These stress risers may lead to localized cracking in the female member 86 or a "flaring-out" of a receiving end 98 of the female member 86 due to the force exerted by the male member 84 on the female member 86 through locking ring 82 during connection and pressurization of the coupling assembly.

Figure 6:
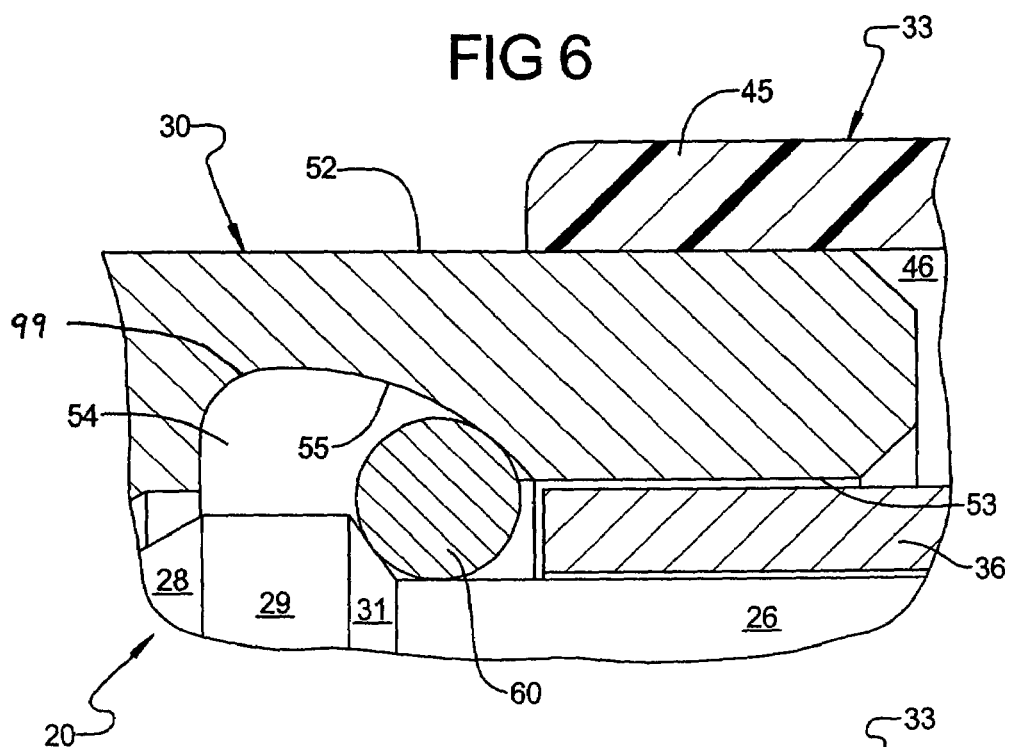
FIG. 6 is a cross-sectional view of a coupling assembly connecting interface according to another embodiment of the invention.
Figure 7:
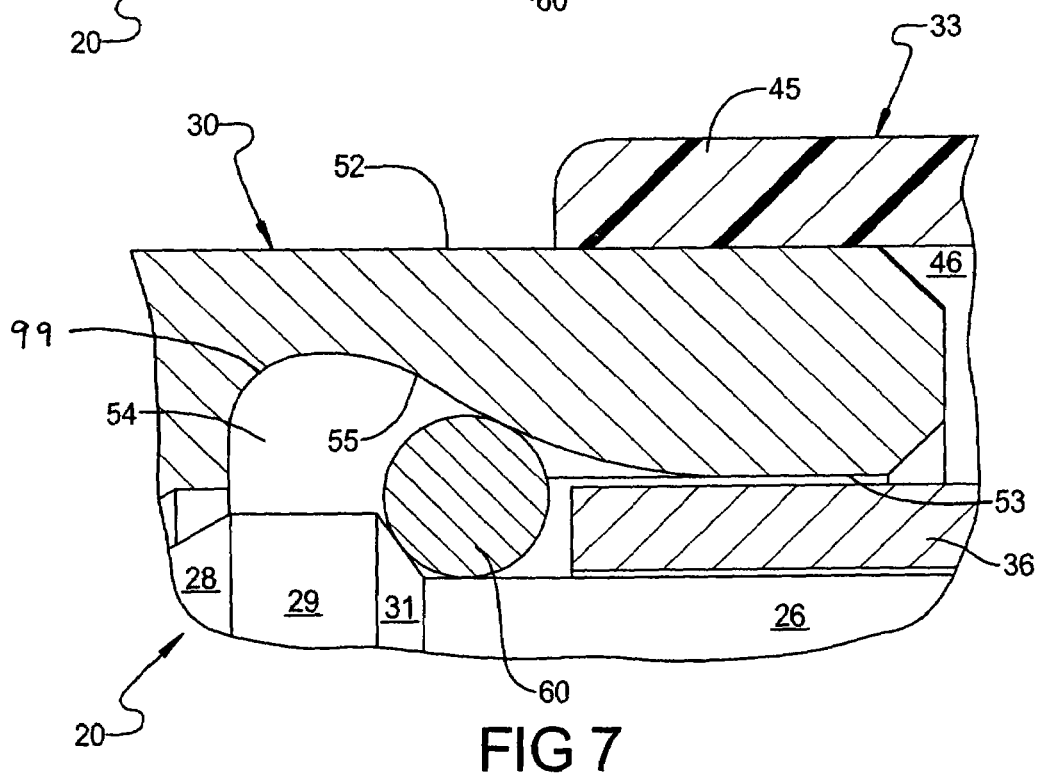
FIG. 7 is a cross-sectional view of a coupling assembly connecting interface according to another embodiment of the invention.

In the embodiments of the present invention shown in FIGS. 4, 6 and 7, groove 54 does not include points 96 and 97 found in the prior art coupling. Similarly, in the embodiment of the present invention shown in FIG. 5, point 96 in the prior art coupling is absent. In the embodiments shown in FIGS. 4, 6 and 7, a fillet radius 99 is disposed between the forward surface of groove 54 and second locking surface 55 to reduce or eliminate the occurrence of stress risers in the female member 30. In the embodiment shown in FIG. 6, the second locking surface 55 in groove 54 is a concave surface. Similarly, in the embodiment shown in FIG. 7, the second locking surface 55 is a convex surface.

As will be appreciated from review of FIGS. 4-7, the inwardly facing annular groove 54 of the present invention is configured to reduce stress risers in the female member 30 by virtue of the groove's geometry. Particularly, groove 54 reduces the number of, or eliminates entirely, surfaces that intersect at a point, which have been known to cause stress risers in prior art coupling assemblies. While several embodiments of groove 54 have been shown that reduce stress risers in the female member 30, the groove profiles shown in FIGS. 4-7 are not intended to be limited thereto.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A coupling assembly comprising:
   a first coupling member extending along an axis from a leading end to a trailing end and including a first exterior surface and a second exterior surface spaced from the first exterior surface by a rib that includes a ramp extending outwardly and away from the first exterior surface and a first locking surface that extends inwardly toward the second exterior surface;
   a second coupling member extending from a receiving end to a remote end and including an inwardly facing surface sized to receive the first coupling member, the second coupling member also including an inwardly facing annular groove configured to reduce stress risers in the second coupling member, the inwardly facing annular groove having a convex surface that defines a second locking surface;
   a resiliently expandable locking ring received in the second coupling member inwardly facing annular groove in a first position, the resiliently expandable locking ring having an interior diameter sized to receive the first coupling member first exterior surface and to be engaged and expanded to a larger radial size by the ramp upon movement of the first coupling member further into the second coupling member, the resiliently expandable locking ring configured to retract in diametrical size resiliently to become trapped between the first locking surface and the second locking surface in a second position upon further movement of the first coupling member into the second coupling member; and
   a release sleeve configured to urge the locking ring axially toward the rib, and in doing so, to be urged outwardly by the first locking surface, such that the first coupling member can be released from the second coupling member.

2. A coupling assembly comprising:
   a first coupling member extending along an axis from a leading end to a trailing end and including a first exterior surface and a second exterior surface spaced from the first exterior surface by a rib that includes a ramp extending outwardly and away from the first exterior surface and a first locking surface that extends inwardly toward the second exterior surface;
   a second coupling member extending from a receiving end to a remote end and including an inwardly facing surface sized to receive the first coupling member, the second coupling member including an inwardly facing annular groove having a second non-linear locking surface and a forward surface that transitions into the second locking surface without forming a point when viewed in cross-section;

a resiliently expandable locking ring positioned in the second coupling member inwardly facing annular groove, the resiliently expandable locking ring having an interior diameter sized to receive the first coupling member first exterior surface and to be engaged and expanded to a larger radial size by the ramp upon movement of the first coupling member further into the second coupling member, the resiliently expandable locking ring configured to retract in diametrical size resiliently to become trapped between the first locking surface and the second locking surface upon further movement of the first coupling member into the second coupling member; and a release sleeve configured to urge the locking ring axially toward the rib, and in doing so, to be urged outwardly by the first locking surface, such that the first coupling member can be released from the second coupling member.

3. The coupling assembly of claim 2, wherein the transition between the first and second surface portions includes a fillet radius.

4. The coupling assembly of claim 2, wherein the second locking surface is a concave surface.

5. The coupling assembly of claim 2, wherein the second locking surface is a convex surface.

* * * * *